United States Patent [19]

Watanabe et al.

[11] Patent Number: 4,678,646

[45] Date of Patent: Jul. 7, 1987

[54] CRYSTALLIZER

[75] Inventors: Morio Watanabe, Hyogo; Sanji Nishimura; Nobuatsu Watanabe, both of Kyoto, all of Japan

[73] Assignee: Solex Research Corporation of Japan, Tokyo, Japan

[21] Appl. No.: 815,200

[22] Filed: Dec. 30, 1985

Related U.S. Application Data

[63] Continuation of Ser. No. 439,785, Nov. 8, 1982, abandoned.

[30] Foreign Application Priority Data

Nov. 11, 1981 [JP] Japan .................. 56-179664

[51] Int. Cl.⁴ .................. B01D 9/00; B01D 11/04
[52] U.S. Cl. .................. 422/245; 422/253; 422/257; 366/136
[58] Field of Search .............. 422/245, 252, 254, 255, 422/257, 261, 281, 259; 366/136, 137, 270; 423/658.5

[56] References Cited

U.S. PATENT DOCUMENTS

| | | | |
|---|---|---|---|
| 2,435,898 | 2/1948 | Otto | 422/252 |
| 2,664,349 | 12/1953 | Sable | 422/252 |
| 2,685,499 | 8/1954 | Hood | 366/137 |
| 3,306,710 | 2/1967 | Messing | 422/252 |
| 3,600,138 | 8/1971 | Voigt | 422/252 |
| 3,627,496 | 12/1971 | Hermann | 422/245 |

OTHER PUBLICATIONS

Mullin, Crystallisation, CRC Press–England, 1972.

Primary Examiner—Gary P. Straub
Attorney, Agent, or Firm—Toren, McGeady & Associates

[57] ABSTRACT

A crystallizer comprising a mixing zone of an organic solvent containing ions of a metal extracted therein and an aqueous separating solution provided at the upper part of a main crystallizer body, a lower-part opened organic solvent settling zone provided outside of the mixing zone for receiving and settling the organic solvent overflowing out of the mixing zone, a crystals developing zone having a downwardly narrowing cross section provided at the lower part of the main crystallizer body, a descending pipe extending from the lower end of the mixing zone to the lower part of the crystals developing zone, a crystals fluidizing medium inlet provided at the lower end of the crystals developing zone, a separating solution discharge pipe and a crystals discharge pipe. By applying an aqueous separating solution, in which the solubility of the metallic salt in object is small, for transferring metal ions in an organic solvent therein, it is possible to obtain the crystals of said metallic salt with no need of concentrating the separating solution by evaporation.

3 Claims, 4 Drawing Figures

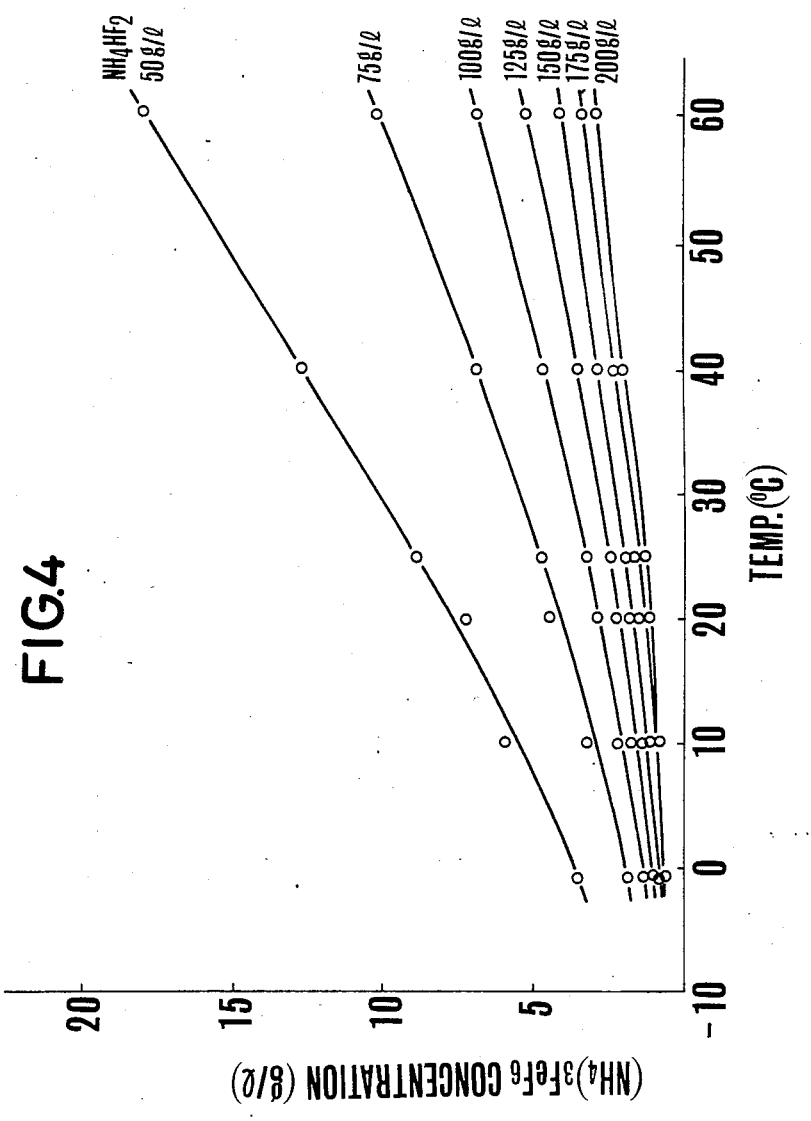

4,678,646

CRYSTALLIZER

BACKGROUND OF THE INVENTION

1. Field of the Invention

This is a continuation of application Ser. No. 439,785, filed Nov. 8, 1982, now abandoned.

The present invention relates to a crystallizer or, more particularly, a crystallizer with which ions of a metal extracted in an organic solvent are transferred in an aqueous separating solution for concentrating and crystallizing the metallic salt therein by separating the metal ions completely from the organic solvent with no need of concentrating the aqueous solution by evaporation.

2. Description of Prior Art

Conventional methods for crystallizing a metallic salt from its aqueous solution are to precipitate the crystals by concentrating the solution by evaporation in a crystallizer. For sparing the energy necessary for evaporation, vacuum evaporation and, for increasing the efficiency, a multistage pressure reducing method are adopted. A substance having a large difference in the solubility with temperature is crystallized by cooling the solution. In some instances, another salt is added outside of the crystallizer for decreasing the solubility of the salt in object.

In this way, in the conventional methods, water must be evaporated for concentrating the metallic salt in object or another salt is added for decreasing the solubility of the salt in object, thus accompanying a large energy consumption.

On the other hand, in the field of solvent extraction in which metal ions extracted in an organic solvent are taken out as a salt in a separating solution, when the separating solution is an aqueous solution in which the solubility of the metallic salt in object is small, crystals of the salt are precipitated in a mixing tank for mixing the separating solution and the organic solvent, adhering on the inner wall of the mixing tank and the wings of the stirrer provided therein. The smooth operation for a long while in the mixing tank becomes impossible, and a precious organic solvent is consumed uneconomically due to the adhesion thereof on the crystals. Particularly, since such complex salts as metal-ammonium fluorides and metal-ammonium sulfates are hardly soluble in water, said phenomena take place remarkably, preventing the industrial utilization of the process.

Under such circumstances, the industrial methods conventionally applied for utilizing the art of solvent extraction for recovering crystals have been to use an aqueous solution, in which the metal ions in object are highly soluble, for separating said metal ions extracted in an organic solvent therein and then to apply a conventional method for concentrating the solution by evaporation in a crystallizer, but it is the present status that such a method is uneconomical because of high energy cost.

SUMMARY OF THE INVENTION

By overcoming the conventional difficulties as above mentioned, the present invention is to offer an energy-saving type crystallizer which can be applied for transferring ions of a metal extracted in an organic solvent into an aqueous separating solution in which the metal ions are hardly soluble for obtaining uniform crystals with no need of evaporating the solution.

The present invention relates to a crystallizer comprising a mixing zone of an organic solvent containing ions of a metal extracted therein and an aqueous separating solution provided at the upper part of a main crystallizer body, a lower part opened organic solvent settling zone provided outside of the mixing zone for receiving and settling the organic solvent overflowing out of the mixing zone, a crystals developing zone having a downwardly narrowing cross section provided at the lower part of the main crystallizer body, a descending pipe extending from the lower end of the mixing zone to the lower part of the crystals developing zone, a crystals fluidizing medium inlet provided at the lower end of the crystals developing zone, a separating solution discharge pipe and a crystals discharge pipe.

BRIEF EXPLANATION OF THE DRAWINGS

FIG. 4 is a diagram showing the solubility of $(NH_4)_3FeF_6$ in water.

DETAILED DESCRIPTION OF THE INVENTION

Figure 1:
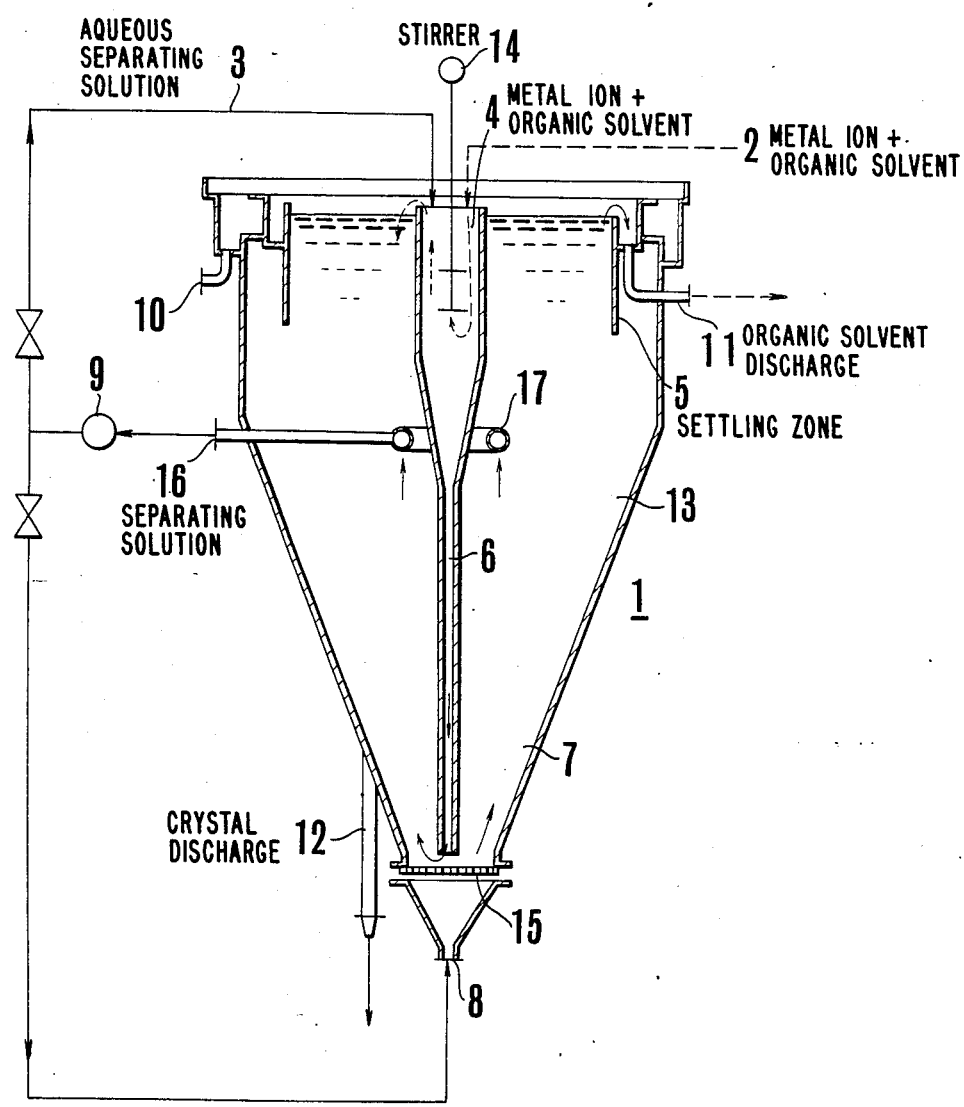
FIG. 1 is a longitudinal section of an example of the present inventive crystallizer.

The present invention will be described in detail in the following with reference to the drawings, but the invention is not limited thereto.

The present inventive crystallizer will be explained with reference to FIG. 1 in the first place. An organic solvent containing ions of a metal extracted therein (an organic phase) 2 and an aqueous separating solution 3 are introduced in a mixing zone 4. The organic solvent is immiscible with water, and the separating solution contains a constituent capable of forming a salt of low solubility with the metal ions extracted in the organic solvent. Then, the metal ions in the organic phase 2 are transferred into the separating solution due to the effect of stirring with the use of a stirrer 14. The separating solution 3, in which the concentration of the metallic compound is increased, descends through the descending pipe 6 while separating the organic solvent due to the effect of the difference of specific gravity and forming the crystal nuclei of the compound formed, and enters in the crystals developing zone 7 having a reversed conical shape in its section. The organic solvent almost completely separated in the mixing zone 4 overflows therefrom into a settling zone 5 and accumulates above the separating solution in the crystals developing zone 7, and then discharged through an organic solvent discharge pipe 11. (An organic solvent has generally a density smaller than that of water.) The organic solvent adhered on the crystals is removed when the crystals are developed in the crystals developing zone 7, and the crystals are freed from the organic solvent. The separating solution flows upwards through the crystals developing zone 7 while precipitating and developing the crystals. Due to the increase of the sectional area of the crystals developing zone, the ascending speed of the separating medium is slowed down to sediment the crystals, and the crystals precipitated are almost perfectly separated at the joint part of the upper part of the reversed conical crystals developing zone and the upper cylindrical part of the crystallizer (crystals separating zone 13). A part of the separating solution is then discharged through a separating solution discharge pipe 10, another part thereof enters a ring pipe 17 and is circulated through a separating solution circulating pipe 16 into the mixing zone 4 as the separating solution 3, and a further part thereof is sent to a crystals fluidizing medium inlet 8 provided at the bottom of the main crystallizer body 1 for accelerating the flow rate of the separating solution at the lower part of the crystals developing zone 7 and preventing the sedimentation of the crystals at the same part with the aid of a lattice 15. The crystals are discharged through a crystals discharge pipe 12 provided at a proper position of the reversed conical type crystals developing zone 7, and are subjected to further treatment.

Figure 2:
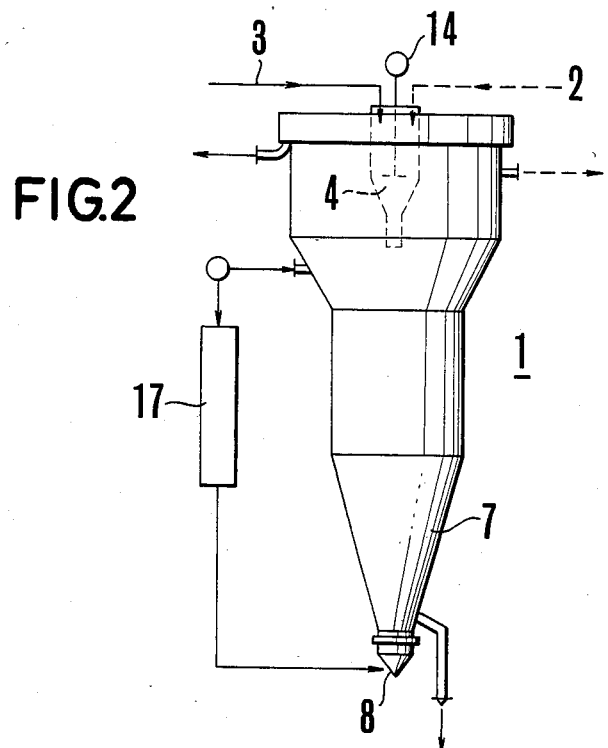
FIGS. 2 and 3 are respectively the front view of a modification of the present inventive apparatus shown in FIG. 1.

FIG. 2 is a front view of an modification of the present inventive apparatus shown in FIG. 1. This example is suitable for the use when the solubility of the metallic compound to be crystallized in the aqueous separating solution is relatively large. It is possible to accelerate the precipitation of the crystals by cooling the separating medium coming out of the separating solution circulating pipe 16 with the use of a cooler 17 for lowering the temperature of the separating solution at the crystals developing zone 7. The other parts of the apparatus is the same as in FIG. 1.

Figure 3:
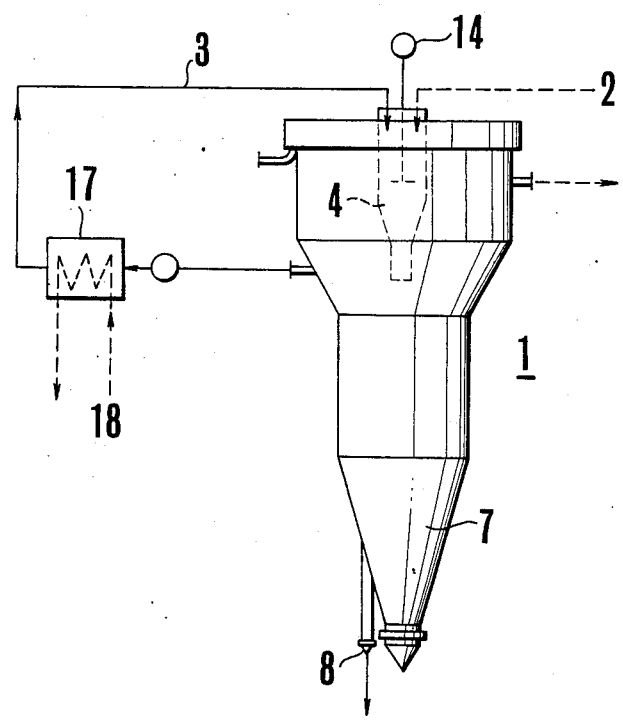

Another modification of the present inventive apparatus shown in FIG. 3 is to heat the separating medium with the use of a heater 17 for preventing that the crystals precipitate too much in the mixing zone 4 and the descending pipe 6 when the solubility of the metallic compound to be crystallized is too small contrary to the case of FIG. 2. The other parts of the apparatus is the same as in FIG. 1.

The cooler or the heater 17 may be cooled or heated by using a coolant or steam 18.

As described above, the present invention relates to a crystallizer with which metal ions extracted in an organic solvent are transferred into an aqueous separating solution, which contains a constituent capable of forming hardly soluble salt with said metal ions for the crystallizing thereof. There is no need of concentrating the separating solution by evaporation, the crystals produced are uniform, and the loss of organic solvent due to the adhesion of the solvent to the crystals are small. Thus, the present inventive apparatus can be operated quite economically.

DESCRIPTION OF PREFERRED EMBODIMENT

The action of the present inventive apparatus will now be described according to the examples.

EXAMPLE 1

30% of D2EHPA (di-2-ethylhexyl phosphoric acid) as an extractant was diluted with 70% of normal paraffine to form an organic solvent, and the organic solvent containing 12.6 g/l of $Fe^{3+}$ ions was supplied in the mixing zone of the crystallizer shown in FIG. 1 with a rate of 10 l/hr. Simultaneously, an aqueous $NH_4HF_2$ solution with a concentration of 100 g/l and containing 4.5 g/l of $(NH_4)_3FeF_6$ as an aqueous separating solution was also supplied in the mixing zone of the crystallizer with a rate of 20 l/hr. $Fe^{3+}$ ions in the organic phase was transferred into the aqueous phase forming the precipitates of a complex salt, $(NH_4)_3FeF_6$, according to the reaction:

$$R_3Fe + 3NH_4HF_2 \rightleftharpoons 3R\cdot H + (NH_4)_3FeF_6 \downarrow \quad (1)$$

where R·H shows an extractant in the organic solvent, and $R_3Fe$ shows $Fe^{3+}$ ions extracted in the organic solvent.

In a conventional mixer-settler type apparatus, crystals obtained are adhered on the wall of the mixing tank with a thickness of about 30 mm and on the wings of the stirrer in such an extent that the wings of the turbine cannot be seen perfectly after 3 hours' operation, and the $Fe^{3+}$ ions in the organic solvent cannot be transferred in the aqueous phase after 5 hours' operation. The size of the crystals obtained are in the order of 2 to 10 $\mu$.

In contrast to this, after 120 hours' operation in the present inventive apparatus, while some crystals were adhered on the wings of the stirrer with a thickness as thin as 1 to 0.5 mm, there was no adhesion thereof on the wall of the mixing zone. The process of separating the organic solvent in the course of forming crystal nuclei in the crystals developing zone could distinctly be observed with the naked eye. The crystals discharged were uniform with a size of 50 to 70 $\mu$. Other properties of the crystals obtained in both instances were as shown in Table 1.

TABLE 1

| Crystals | organic solvent content (wt. %) | Water content (wt. %) | Separation rate (%) |
|---|---|---|---|
| In conventional mixer | 4.2 | 62 | 81 |
| In the present inventive apparatus | 0.081 | 28 | 96 |

The solubility of $(NH_4)_3FeF_6$ in an aqueous $NH_4HF_2$ solution (HF=0 g/l) is small as shown in FIG. 4, so that said solution can separate $Fe^{3+}$ ions from the organic phase and crystallize the ions as $(NH_4)_3FeF_6$ therein with no need of evaporation. The crystals obtained by utilizing the present inventive apparatus contain only a small amount of the organic solvent as shown in Table 1.

EXAMPLE 2

10% TOA (trioctylamine) as an extractant was diluted with 90% of an aromatic hydrocarbon to form an organic solvent, and the organic solvent containing 6 g/l of $VO_3^-$ ions was supplied in the mixing zone with a rate of 10 l/hr. Simultaneously, an aqueous $NH_4Cl$ solution with a concentration of 4 mols/l and a pH of 8 was also supplied as an aqueous separating solution in the mixing zone with a rate of 10 l/hr. Due to the mixing of the two solutions, the reaction takes place according to the equation (2) for separating $VO_3^-$ ions in the organic phase into the aqueous phase to form the crystals of ammonium vanadate, $NH_4VO_3$.

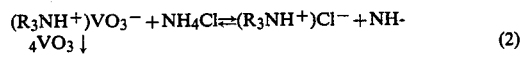

$$(R_3NH^+)VO_3^- + NH_4Cl \rightleftharpoons (R_3NH^+)Cl^- + NH_4VO_3 \downarrow \quad (2)$$

In a conventional mixer-settler type apparatus, crystals were adhered on the wall of the mixing tank and on the wings of the stirrer, and the operation became impossible after 30 hours. The crystals obtained were fine and clayish with a diameter of less than 20 $\mu$ and contained a large amount of the organic solvent. It was necessary to redissolve and recrystallize.

In contrast to this, in the present inventive apparatus, the operation could be done continuously for a long while, and the crystals obtained were 100 to 150 μ in diameter.

The results of the operation in the two apparatuses will be compared in Table 2.

TABLE 2

| Apparatus | Organic solvent content (wt. %) | Size of the crystals (μ) | Water content (wt. %) | Separation rate (%) |
| --- | --- | --- | --- | --- |
| Conventional (mixer-settler type) | 14.8 | 0.5–20 | 72 | 98–98.5 |
| Present inventive | 0.03 | 100–150 | 31 | 99–100 |

It was ascertained by the naked eye that the crystals obtained in the present invention had an transparency very higher than that of the crystals obtained by the conventional mixersettler type apparatus, and this is to prove that the amount of the organic solvent adhered on the crystals were very small as compared with the case of the conventional method.

In applying the present inventive crystallizer, it is possible to use an aqueous solution, in which the solubility of the metallic salt in object is small, as a separating solution to transfer the metal ions in an organic solvent therein. Therefore, it is possible to obtain the crystals in object with no need of concentrating the separating solution by evaporation.

What we claim:

1. A crystallizer for crystallizing metal values from an organic solvent containing ions of the metal values by mixing therewith a stripping solution comprising a crystallizing tank comprising an upper section and a lower section for precipitating crystals of the metal values from the stripping solution, said lower section reducing in dimension toward the lower end and having an inlet for a recycled stripping solution at the lower end thereof, a top-opened mixing tank provided in the upper section of the crystallizing tank and having a solution inlet and a downward pipe extending through the crystallizing tank and opening to the lower section of the crystallizing tank, said mixing tank mixing the organic solvent containing the metal ions with the stripping solution to strip the metal ions into the stripping solution and allowing the stripping solution to flow down the downward pipe, a crystal discharge pipe communicating to the lower section of the crystallizing tank for discharging the crystals precipitated from the stripping solution to the exterior of the crystallizing tank, a zone for settling the organic solvent stripped off the metal ions overflowing from the mixing tank, provided in the upper portion of the upper section around the mixing tank, a discharge pipe for discharging an overflow from the setting zone to the exterior of the crystallizing tank, and a ring discharge pipe provided through the crystallizing tank at or near the border line between the upper and lower sections for discharging the stripping solution and communicating to a solution circulation system for recycling the stripping solution to both the mixing tank and to the inlet in the lower end of the tank.

2. A crystallizer according to claim 1 which further comprises means provided in the lower section for stirring upward the solution coming through the solution inlet.

3. A crystallizer according to claim 1 which comprises means for adjusting the temperature of the solution before it is introduced into the crystallizing tank through the solution inlet.

* * * * *